May 2, 1961  H. W. BATCHELLER  2,982,329
APPARATUS FOR CRIMPING AN ELECTRIC TERMINAL MEMBER ON A WIRE
Filed Oct. 31, 1957
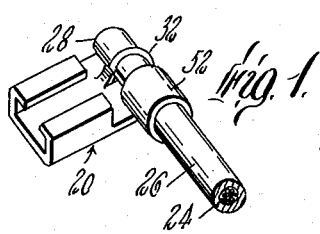
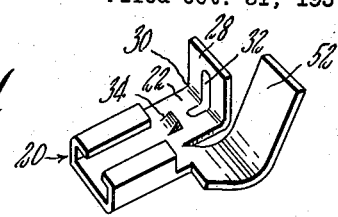
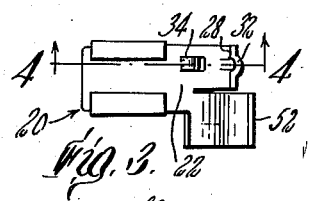
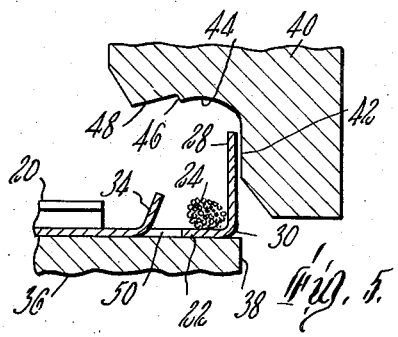
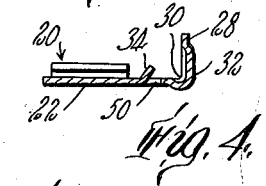
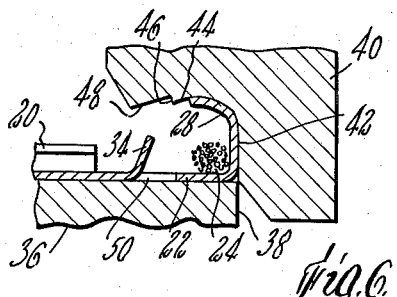
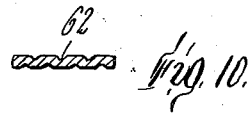
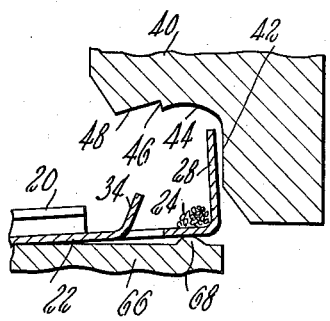
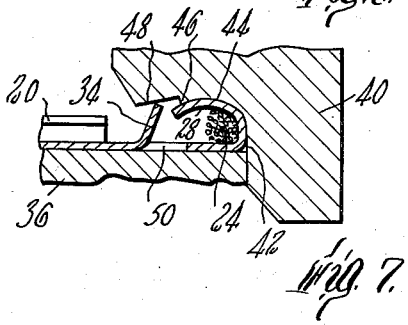
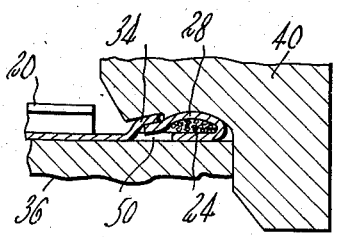
Inventor
Hugh W. Batcheller
by Morse & Altman
Attys.

United States Patent Office 2,982,329
Patented May 2, 1961

2,982,329

APPARATUS FOR CRIMPING AN ELECTRIC TERMINAL MEMBER ON A WIRE

Hugh W. Batcheller, Newton Highlands, Mass., assignor to Kent Mfg. Corp., Newton, Mass., a corporation of Massachusetts Filed Oct. 31, 1957, Ser. No. 693,712

2 Claims. (Cl. 153—1)

This invention relates to apparatus for crimping an electric terminal on a wire to which it is to be attached. Electric terminals such, for example, as connector members are attached to the ends of wires prior to their being put to use. There are various ways of attaching a metal member to the end of a wire but the most frequently used form of connection is made by crimping a tongue or tongues of metal around the bared end portion of an insulated wire. If this is properly done, a connection can be had which is as good electrically as a connection made by soldering or welding the wire to the metal piece.

Some electric connector members are made to be attached to wires which are laid at right angles to the long axis of the connector member. In such case, a tongue is provided which extends in the direction of the axis of the member, such tongue being adapted to be wrapped or crimped around the end portion of wire to make the joint or connection between the metal member and the wire. When such a tongue is crimped or curled about a wire, the metal retains a tendency to unroll or relax somewhat, no matter how much force is exerted in the crimping operation. This tendency to relax is often augmented by temperature conditions in case current which is passing through the wire and terminal member heats up the joint between them. It is an object of the present invention to make the joint secure so that the tongue which is crimped around the wire cannot relax so as to ease the pressure of the crimped tongue on the wire itself. Such pressure between the metal member and the wire which it embraces is important for a good electrical connection.

According to the invention, the tongue which is crimped around a wire is secured in place by means of a small lug or tab which is struck up from the standing part of the tongue in such a way as to overlap the extremity of the tongue after the latter has been wrapped around the wire. For a more complete understanding of the invention reference may be had to the following description thereof and to the drawing of which—

Figure 1 is a perspective view of an electric terminal member attached to the end of an insulated wire;

Figure 2 is a perspective view of the terminal member before being attached to a wire;

Figure 3 is a plan view of the same;

Figure 4 is a section on the line 4—4 of Figure 3;

Figures 5, 6, 7 and 8 are sectional views of a crimping mechanism operating on a terminal member to crimp the wire gripping portion thereof about a wire, these figures showing successive stages of the operation;

Figure 9 is a perspective view of a terminal member similar to that shown in Figure 2 except that both of the wire-embracing tongues are longitudinally corrugated;

Figure 10 is a section on the line 10—10 of Figure 9;

Figure 11 is a sectional view of a slightly modified mechanism for crimping the wire embracing part of the terminal member; and Figure 12 is a sectional view of a terminal member which has been crimped to a wire by the mechanism shown in Figure 11.

While the invention relates to joints between any sheet metal member and a wire, a connector member 20 which is adapted to be attached to a wire disposed at right angles to its longitudinal axis is illustrated on the drawing by way of example since the problem of making a tight electrical connection between a terminal member of this kind and a wire has been found to be particularly troublesome, but the invention is not limited to any particular type of terminal member. As shown in Figure 2 the member 20 has a tongue 22 which is adapted to be crimped to a bared end of a wire 24 which is insulated as at 26. The tongue 22 is an integral extension of the floor of the connector member 20 and projects from the terminal portion of the member along the longitudinal axis thereof. In order to facilitate the crimping operation, the end portion 28 of the tongue 22 is bent upward as indicated in Figure 2 forming an angle 30 to receive a wire 24 as illustrated in Figure 5. If desired, the tongue 22 may be provided with a longitudinal indentation 32 to stiffen it so that when it has been crimped around a wire as hereinafter described, the rib 32 will help to oppose the tendency on the part of the tongue to relax slightly its grip on the wire 24. According to the present invention, however, a more positive means is provided for anchoring the tongue in its crimped position and preventing any relaxing or loosening thereof. To this end a tab or lug 34 is struck up from the standing portion of the tongue 22, that is, the portion which is adjacent to the terminal part of the member 20. This lug is formed by a U-shaped cut and is struck up from the plane of the standing portion of the tongue 22 so that it assumes a vertical or nearly vertical position as indicated in Figures 5 to 7. When a terminal member 20 is to be attached to the bared end of a wire the member is placed on the horizontal top surface of an anvil 36, this anvil having a front vertical face 38. The member 20 is placed so that the upstanding portion 28 of the tongue 22 is near the edge of the top of the anvil. Vertically movable above the anvil is a suitably shaped die 40. This die has a vertical rear face 42 which is substantially in the plane of the vertical face 38 of the anvil 36. Thus when the die 40 is forced downward, the vertical face 42 slids along the face 38 of the anvil when the die descends to a low enough position as indicated in Figures 7 and 8. From the top of the face 42 is an arched surface 44 which extends toward the rear and is curved to be engaged by and to crimp the upstanding portion 28 of the tongue 22 when the die 40 descends. The arched surface 44 terminates with a step 46 which presents a shoulder toward the rear. From this shoulder another surface portion 48 extends rearward and slightly downward. The surfaces 44 and 48 and the shoulder 46 are directly over the anvil 36 so that they operate on portions of the tongue 22 when the die 40 descends. Steps of the crimping operation are illustrated in Figures 6, 7 and 8 of the drawing. As shown in Figure 6, when the die 40 descends, the upper extremity of the upstanding portion 28 of the tongue engages the arched surface 44 and is curled rearward thereby until its extremity passes beyond the shoulder 46. Thereupon, as illustrated in Figure 7, the lug 34 engages the sloping surface 48 and is bent forward and downward thereby. When the die descends to the lower extremity of its stroke, as shown in Figure 8, it crimps the tongue tightly around the wire 24 and also presses the lug 34 down tightly in an overlapping position over the extremity of the tongue. The pressure on the lug 34 may be sufficiently heavy to cause the lug to press the mid portion of the extremity of the tongue slightly downward into the hole 50 from which the lug 40 was struck. Since the lug 34 is relatively short and therefore stiff, it firmly holds the extremity of the tongue down against the standing part of the tongue so that it cannot relax to ease the pressure of the tongue on the wire which it embraces.

Ordinarily, a second tongue 52 is provided to embrace the portion of the insulated wire which is adjacent to the bared end. This tongue is parallel to and longer than the tongue 22 since it has to embrace an element of greater diameter, this element including the insulation as well as the wire itself. This tongue may be provided with a locking tab if desired but ordinarily it will not be required since the strength of the grip of the crimped tongue 52 on the insulated portion of the wire is not so important as the strength of the grip of the tongue 22 on the wire itself the latter forming the joint through which the electric current flows.

Instead of the stiffening rib 32 extending along the median of the tongue 22, one or both of the tongues may be longitudinally corrugated as indicated at 60 and 62 in Figures 9 and 10. Such corrugations serve to counteract to a considerable extent the natural tendency on the part of crimped tongues to relax a little when the crimping pressure thereon is relieved.

The anvil 36 and the die 40 operate most effectively on the particular size of wire 24 for which they are designed. If it becomes necessary or desirable to employ the die to crimp a tongue about a wire of a size smaller than that for which it was designed, the anvil 36 may be replaced by a similar anvil which is modified by an elongated boss 68 on its upper surface which is located in such a way as to underlie the portion of the tongue 22 on which the wire 24 will be placed as indicated in Figure 11. When the die descends to crimp the tongue about the wire, the boss 68 will indent the underside of the tongue 22 as at 70 (Figure 12), thus causing the tongue 22 to embrace the smaller wire firmly. As heretofore described, the lug 34 will be pressed downward to overlap and lock the extremity of the tongue 22.

It will be evident that there are modifications and changes that may be made in the specific embodiments herein shown and described without departing from the spirit or scope of the invention as set forth in the following claims.

I claim:

1. A crimping mechanism for crimping an upstanding tongue at the end of an electrical connector member about a wire laid on the portion of said member adjacent to said tongue and for pressing down upon the end portion of the crimped tongue a shorter lug upstanding from said adjacent portion of the member and spaced from said tongue, said mechanism comprising an anvil having a horizontal top and a vertical front face, and a crimping die movable downward over said anvil to crimp the upstanding tongue of a connector member supported by said anvil with the tongue at the forward edge thereof, said die having a vertical plane rear face in the plane of the front face of the anvil, a rearwardly arched surface extending from the upper end of said rear face to curl said tongue as the die descends, a step at the end of said arched surface forming a rearwardly facing shoulder, and a rearwardly and downwardly sloping face extending from said shoulder and arranged to engage the end of said upstanding lug when the die descends enough to crimp the end of said tongue beyond said step, whereby said lug is bent forward to overlap the end portion of the tongue.

2. A mechanism as described in claim 1, said anvil having on its top face a low ridge extending parallel to the front edge thereof and located near to but spaced from said edge.

References Cited in the file of this patent

UNITED STATES PATENTS

| | | |
|---|---|---|
| 1,134,507 | Blevney | Apr. 6, 1915 |
| 2,024,416 | Allison | Dec. 17, 1935 |
| 2,704,001 | Morse | Mar. 15, 1955 |
| 2,772,715 | Neijstrom et al. | Dec. 4, 1956 |
| 2,802,194 | Kink | Aug. 6, 1957 |
| 2,811,705 | Schumacher | Oct. 29, 1957 |
| 2,845,108 | Hammell | July 29, 1958 |